(12) United States Patent
Kliskey

(10) Patent No.: US 7,896,055 B2
(45) Date of Patent: Mar. 1, 2011

(54) BEAD HOLDER

(75) Inventor: Roger Kliskey, Brimfield, OH (US)

(73) Assignee: Summit Tool Company, Akron, OH (US)

( * ) Notice: Subject to any disclaimer, the term of this patent is extended or adjusted under 35 U.S.C. 154(b) by 150 days.

(21) Appl. No.: 12/418,834

(22) Filed: Apr. 6, 2009

(65) Prior Publication Data

US 2010/0252206 A1  Oct. 7, 2010

(51) Int. Cl.
  *B60C 25/04* (2006.01)
(52) U.S. Cl. .......................... 157/1.3; 157/1.1
(58) Field of Classification Search ............ 157/1.3, 157/1, 1.1, 1.17
See application file for complete search history.

(56) References Cited

U.S. PATENT DOCUMENTS

| | | | | |
|---|---|---|---|---|
| 2,565,216 A * | 8/1951 | Fox | ............... | 157/1.17 |
| 2,925,857 A * | 2/1960 | Twiford | ............... | 157/1 |
| 2,974,722 A * | 3/1961 | Twiford | ............... | 157/1.22 |
| 3,915,214 A * | 10/1975 | Pile et al. | ............... | 152/379.3 |
| 5,213,146 A * | 5/1993 | Onozawa | ............... | 157/1.3 |
| 5,472,034 A * | 12/1995 | Corghi | ............... | 157/1.24 |
| 6,179,032 B1 * | 1/2001 | Diez | ............... | 157/1.1 |
| 6,269,861 B1 * | 8/2001 | Tran | ............... | 157/1.3 |
| 7,163,041 B1 * | 1/2007 | Tran | ............... | 157/1.3 |
| 7,261,136 B1 * | 8/2007 | Kliskey | ............... | 157/1.3 |
| 7,431,066 B2 | 10/2008 | Du Quesne | | |
| 2002/0195207 A1 * | 12/2002 | Magnani | ............... | 157/1.3 |

OTHER PUBLICATIONS

Ken-Tool® catalog, Bead Holding Device, 2008, p. 27.

* cited by examiner

*Primary Examiner*—David B Thomas
(74) *Attorney, Agent, or Firm*—Renner, Kenner, Grieve, Bobal, Taylor & Weber

(57) ABSTRACT

A bead holder for installing a tire on a wheel includes a body portion, a first portion, and a second portion. The second portion includes a flat inner surface and a flat outer surface. The flat inner surface includes a shoulder and a face, and a ledge defined between the shoulder and the face. A tire may be installed on a wheel using the bead holder by placing the first portion into a lughole on the wheel and bringing the second portion into contact with the rim, whereby the flat outer surface of the second portion prevents a tire bead from slipping back over the rim. A user may then work around the tire bead, stretching it over the rim of the tire without having the tire bead slip back over the rim.

14 Claims, 5 Drawing Sheets

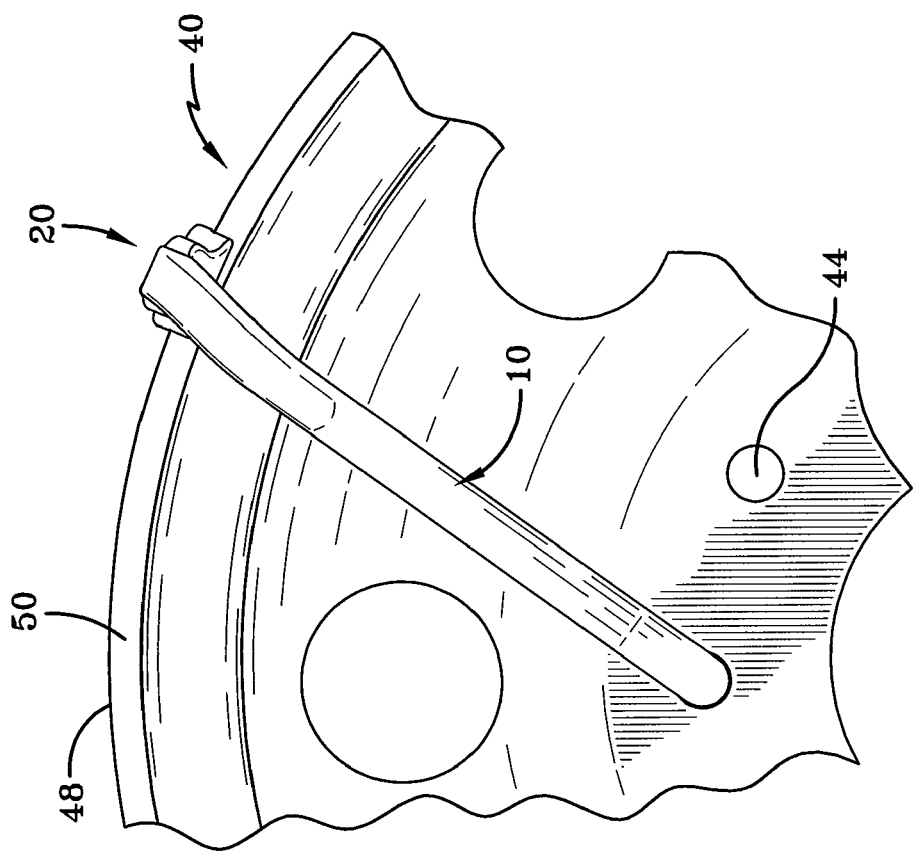
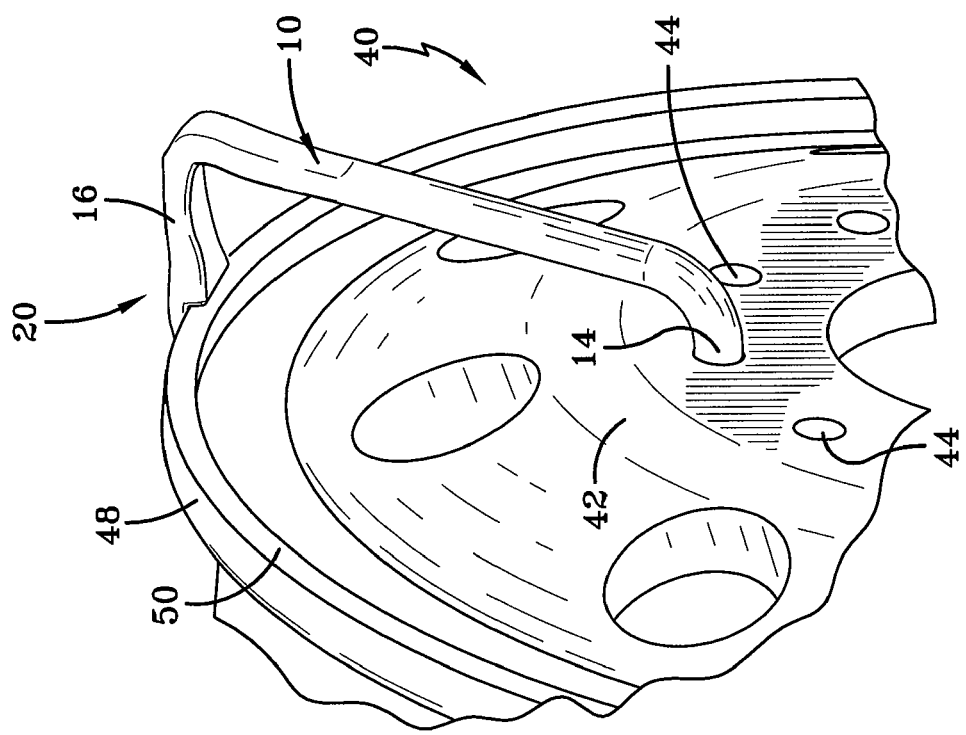

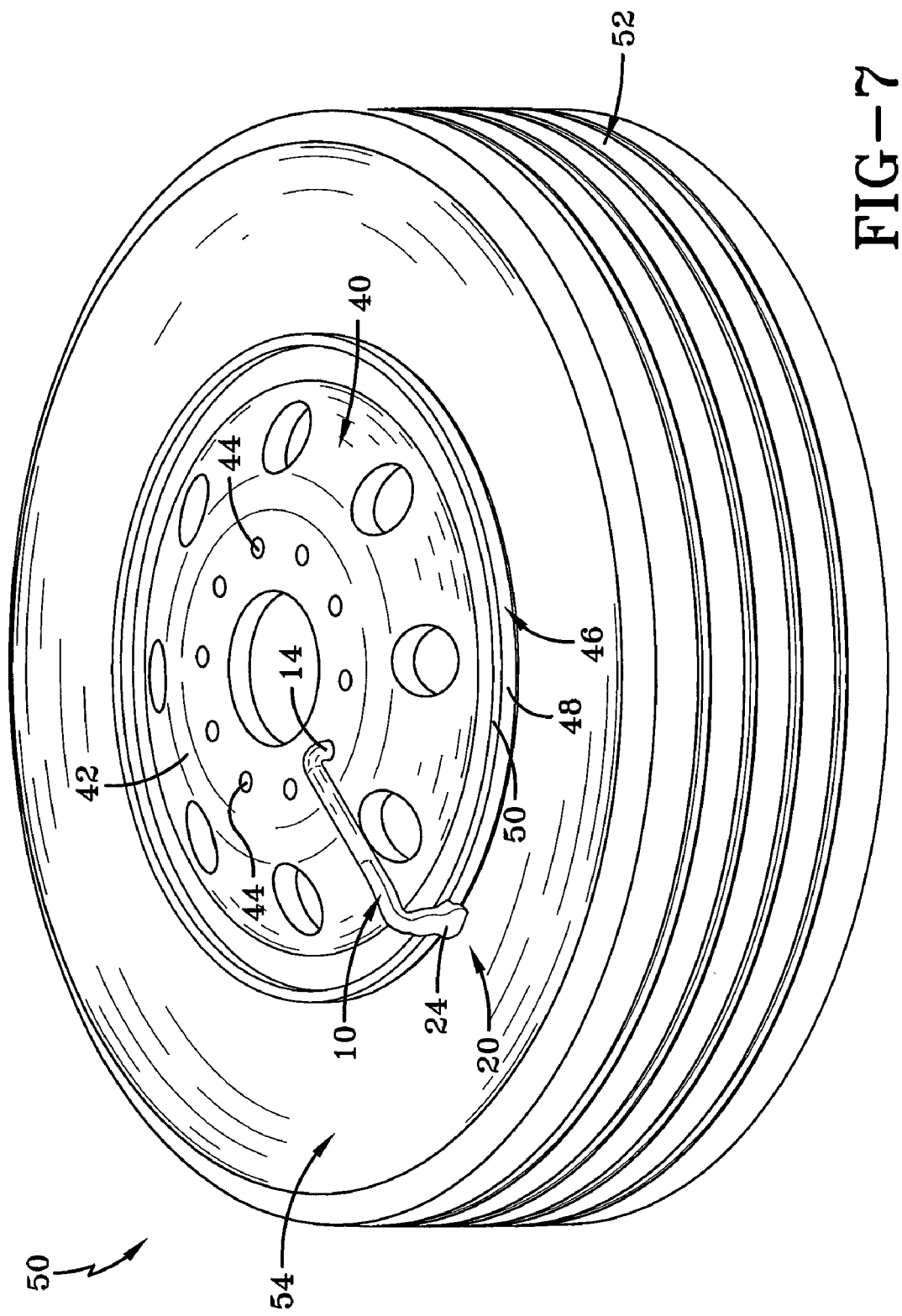

BEAD HOLDER

TECHNICAL FIELD

The present invention relates to tire-mounting tools. More particularly, the present invention relates to a bead holder for keeping a tire bead from slipping off a rim when mounting the tire. The bead holder of the present invention is particularly useful for aiding the mounting of a tire onto a wheel wherein the wheel has a hub that protrudes beyond the rim of the wheel.

BACKGROUND

Mounting tires to wheels is challenging work, especially when done without the assistance of powered machinery. An especially difficult step in mounting a tire is getting both tire beads of the tire over the rim of the wheel. The rim has a larger diameter than each of the tire beads on a tire, so the tire must be stretched to fit each bead over the rim. Because of the shape of tires, getting the first bead over the rim is considerably easier than getting the second bead over the rim. Oftentimes, when attempting to mount the second bead of a tire over the rim of a wheel, the tire bead will slip back over the rim as the person mounting the tire attempts to pry more of the tire bead over the rim. To prevent the second bead from slipping back over the rim, tools are often used to hold one portion of the bead under the rim and to prevent that portion of the bead from slipping back up and over the rim as the tire is mounted over the rest of the rim onto the wheel. Various tools have been used for this purpose, including pry bars, but specialty tools known as bead holders have been developed for mounting tires and holding the bead over the rim.

Prior art bead holders, especially those used for steel wheels, include clamping devices that engage the rim of a wheel on both the hub side and the well side of the wheel. The hub side of the wheel is the central portion of the wheel to which the axle is connected. The well side of the wheel is the outer circumference of the wheel between the inner and outer rims of the wheel. Typical prior art bead holders include a pair of clamping flanges extending from a bulbous head portion that is constructed in a shape and size large enough to prevent the bead of the tire from slipping over it as well as the rim of the wheel and a handle for positioning the bead holder over the rim of the wheel. The handle may be used to help remove the bead holder from the rim once the tire has been successfully mounted onto the wheel. Although some may think otherwise, these bead holders were not designed to pry the bead over the rim and are not effective for doing so.

Disadvantageously, because these prior art bead holders must engage both the hub side and the well side of a rim of a wheel, they cannot be used on certain wheels where the hub protrudes beyond the rim or where there is no recess on the well side of the rim for the bead holder to engage. That is, if the hub protrudes beyond the rim, then there is no recess for the hub-side clamping flange of the prior art bead holder to engage, allowing for that flange to slide off the rim and disengaging the bead holder from the wheel. Likewise, if the well side of the wheel does not have a recess near the rim, then the well-side clamping flange of the prior art bead holder has nothing to engage, thereby allowing for that flange to slide off the rim and disengage the bead holder from the wheel. There are actually several types of wheels currently on the market where the hub protrudes from the rim or where there is no recess on the well side of the rim.

For example, 19.5-inch aluminum wheels have become increasingly popular for certain light- to medium-duty vehicles, but the prior art bead holders cannot be used when mounting a tire onto these wheels. On these 19.5 inch aluminum wheels, the hub protrudes beyond the rim and there is nothing on the well side for prior art bead holders to engage, so prior art bead holders are not useful for installing tires onto these wheels.

Accordingly, a need exists in the art for an improved bead holder that may be used for mounting tires onto wheels, including those wheels that either have hubs that protrude beyond the rims of the wheels, or do not have well side recesses for allowing engagement of the bead holder to that side of the wheel. 19.5-inch aluminum wheels are but one example of such wheels.

SUMMARY OF THE INVENTION

In light of the foregoing, the present invention provides a bead holder for preventing a bead from sliding back over the rim of a wheel when installing a tire on the wheel, the bead holder comprising a body portion having a length that defines an axial plane, a first arm radially extending from the body portion in the axial plane, a second arm extending from the body portion in the same axial plane and having an inner surface and terminating at a tip, wherein the inner surface includes a flat face for contacting the rim of a wheel.

The present invention also provides a bead holder for preventing a bead from sliding back over the rim of a wheel when installing a tire on the wheel, the bead holder comprising a body portion having a length that defines an axial plane, a first arm radially extending from the body portion in the axial plane, a second arm extending from the body portion in the same axial plane and having an inner surface and terminating at a tip, wherein the second arm extends at an angle that is defined between the body portion and the inner surface and is less than ninety degrees.

The present invention also provides a bead holder for preventing a bead from sliding back over the rim of a wheel when installing a tire on the wheel, the bead holder comprising a body portion having a length that defines an axial plane, a first arm radially extending from the body portion in the axial plane, a second arm extending from the body portion in the same axial plane and having an inner surface and terminating at a tip, wherein the tip has a first edge and a second edge and is rotated so that the first edge is nearer the first arm than the second edge.

The present invention also provides a bead holder for preventing a bead from sliding back over the rim of a wheel when installing a tire on the wheel, the bead holder comprising a body portion having a length that defines an axial plane, a first arm radially extending from the body portion in the axial plane, a second arm extending from the body portion in the same axial plane and having an inner surface and terminating at a tip, wherein the inner surface includes a flat face for contacting the rim of a wheel, the second arm extends at an angle that is defined between the body portion and the inner surface and is less than ninety degrees, and the tip has a first edge and a second edge and is rotated so that the first edge is nearer the first arm than the second edge.

The present invention also provides a bead holder for preventing a bead from sliding back over the rim of a wheel having bolt holes when installing a tire on the wheel, the bead holder comprising a body portion having a length that defines an axial plane, a first arm radially extending from the body portion in the axial plane and adapted to be inserted into one of the bolt holes, a second arm extending from the body portion in the same axial plane and having an inner surface and terminating at a tip adapted to extend beyond the rim of the wheel, wherein the body portion is of a length suitable for positioning the first arm in one of the bolt holes and bring the second arm into contact with the rim.

The present invention further provides a method of installing a tire having at least one tire bead onto a wheel having a rim and at least one lughole, the method comprising the steps of placing a portion of one of the at least one tire beads over the rim, providing a bead holder comprising a body portion having a length that defines an axial plane, a first arm radially extending from the body portion in the axial plane, a second arm extending from the body portion in the same axial plane and having an inner surface and terminating at a tip, placing the first portion of the bead holder into one of the at least one bolt holes and positioning the second portion to be in contact with the rim between the wheel and the at least one bead, and mounting the tire bead over the rim.

BRIEF DESCRIPTION OF THE DRAWINGS

These and other features and advantages of the present invention will become better understood with regard to the following description, appended claims, and accompanying drawings wherein:

FIG. 5A is a side perspective view of a bead holder and a wheel, with the bead holder in contact with the rim of the wheel.

FIG. 5B is a front elevation view of the bead holder and wheel shown in FIG. 5A.

FIG. 7 shows a tire completely installed on a wheel.

BRIEF DESCRIPTION OF AN EMBODIMENT OF THE INVENTION

Figure 1:
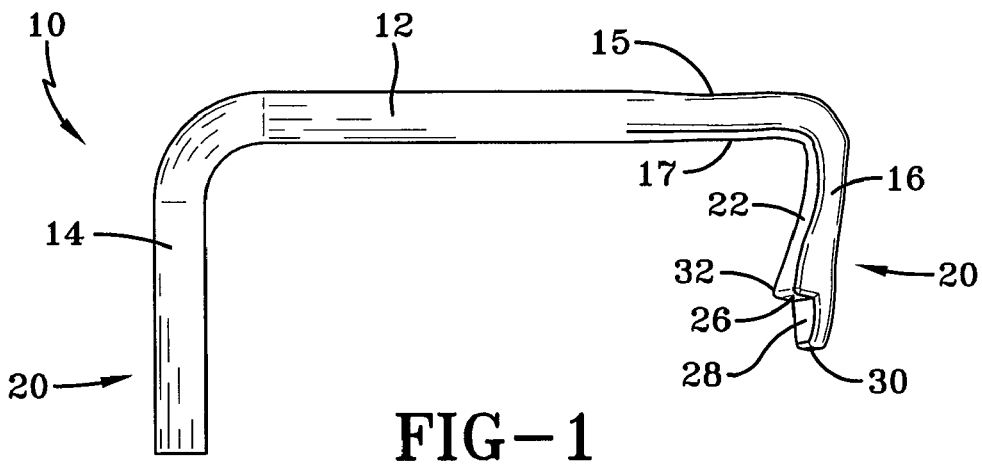
FIG. 1 is a side elevation view of one side of a bead holder according to the concepts of the present invention.

A bead holder constructed according to the concepts of the present invention is designated generally by the numeral 10, and includes a body portion 12, a first arm 14, and a second arm 16. As will be discussed, first arm 14 includes a lughole end 18 that may be inserted into a lughole of a wheel and a rim end 20 that may contact the rim of the wheel. Although the particular arrangement discussed relates to a bead holder for installing a tire on a 19.5 inch aluminum wheel, it will be appreciated that the concepts of the present invention are readily adaptable to bead holders that may be used with different sizes and styles of wheels. For example, the size and/or geometry of the body portion or first or second arm may be modified to accommodate the unique geometry of a given wheel.

Bead holders constructed according to the concepts of the present invention may be made of any material sufficiently strong for the purpose, such as steel, aluminum, brass, iron, or any other synthetic or natural material that will withstand the rigors of holding a tire bead under a rim as a tire is installed onto a wheel.

Returning now to the Figs., bead holder 10 includes body portion 12 which, in one embodiment, has a generally circular cross sectional profile near first arm 14. In one or more embodiments, body portion 12 has a length of approximately 6.5 inches and a circular cross-sectional diameter of approximately 0.5 inches. First arm 14 radially extends from body portion 12 at an angle that is substantially perpendicular to body portion 12. First arm 14 also has a substantially circular cross sectional profile and terminates at lughole end 18. In one or more embodiments, first arm 14 has a length of approximately 3.0 inches and a circular cross-sectional diameter of approximately 0.5 inches.

Figure 2:
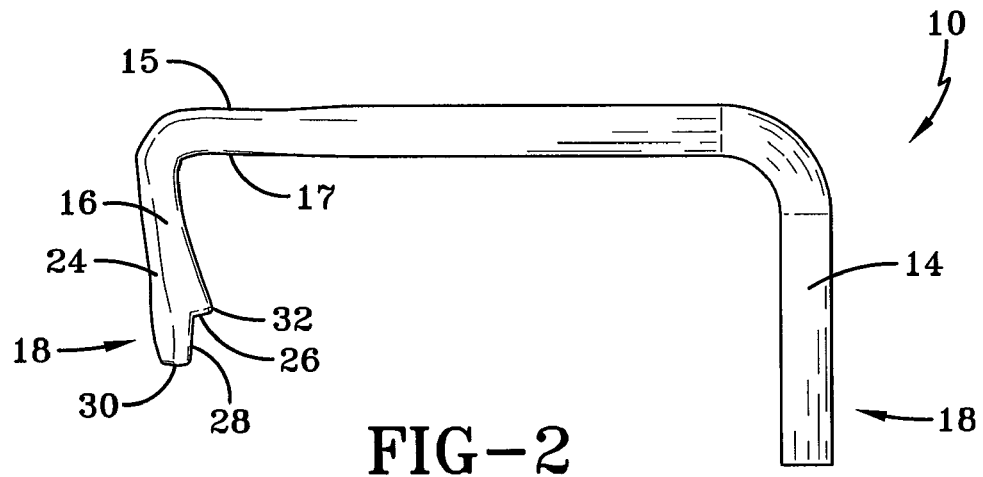
FIG. 2 is a side elevation view of another side of the bead holder shown in FIG. 1.
Figure 3:
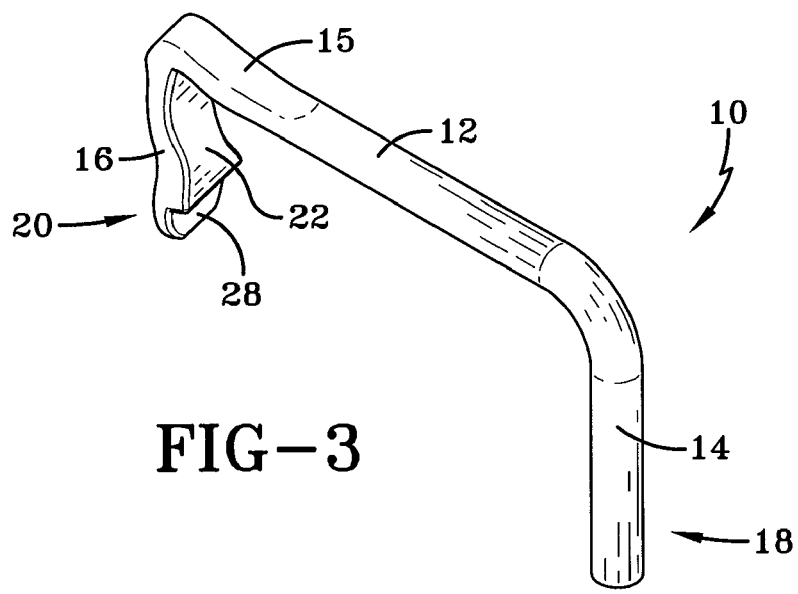
FIG. 3 is a top perspective view of the bead holder shown in FIGS. 1 and 2.

Body portion 12 gradually flattens near second arm 16 so that it has a non-circular cross sectional profile near second arm 16, forming flat upper portion 15 and flat lower portion 17. Second arm 16 radially extends from body portion 12 at an angle other than ninety degrees. In one embodiment, second arm 16 extends from body portion 12 at an angle less than 90 degrees. In another embodiment, second arm 16 extends from body portion 12 at an angle of approximately seventy degrees and has a length of approximately 3.25 inches. Second arm 16 has a generally flat inner surface 22 and a generally flat outer surface 24, which connect with flat lower portion 17 and flat upper portion 15, respectively. That is, flat lower portion 17 essentially extends to flat inner surface 22, and flat upper portion 15 essentially extends to flat outer surface 24. Second arm 16 also includes a rim end 20 for contacting the rim of a wheel, which includes a ledge 26, a face 28, and a tip 30. Second arm 16 gradually widens from the juncture with lower portion 17 of body portion 12 to form a shoulder 32 on inner surface 22. Ledge 26 extends from shoulder 32 toward outer surface 24 in a direction that is substantially parallel to body portion 12. Face 28 extends from ledge 26 to tip 30 and is substantially parallel to outer surface 24. Outer surface 24 extends from the juncture with upper portion 15 of body portion 12 to tip 30 and forms a surface for contacting a tire, as will be discussed. Second arm 16, including rim end 20, taper toward the tip 30, as shown in a somewhat rounded fashion. The tip 30 may be curved at the tip 30 toward the first arm 14, and such a curved tip advantageously tends to stay under the rim of a wheel when the bead holder 10 is used as described below. As best seen in FIGS. 1-3, second arm 16 is canted slightly with respect to body portion 12, so that neither inner surface 22 nor outer surface 24 occupy the plane that is substantially parallel to the axial plane defined by the length of body portion 12. Because of this, face 28 is not perpendicular to the axial plane of body portion 12. In other words, at least the tip is rotated so that one edge (the left edge) of the tip 30 is nearer the first arm 14 than is the other edge of the tip 30 (the right edge, FIGS. 3 and 4B).

Figure 4A:
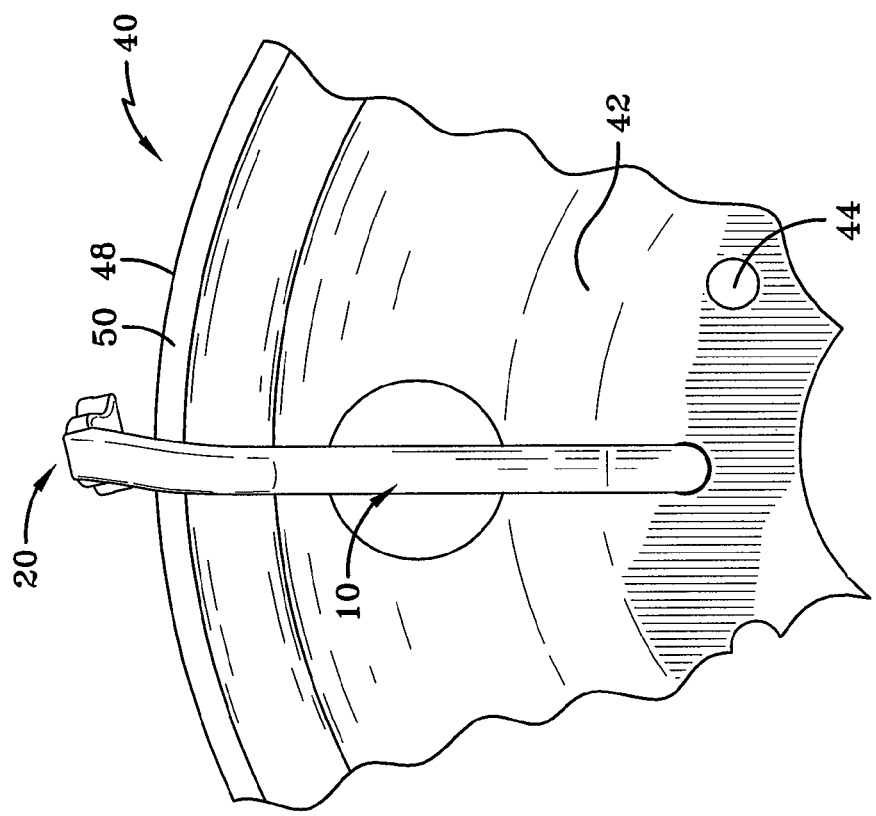
FIG. 4A is a side perspective view of a bead holder and a wheel, with the bead holder extending outside the rim of the wheel.
Figure 4B:
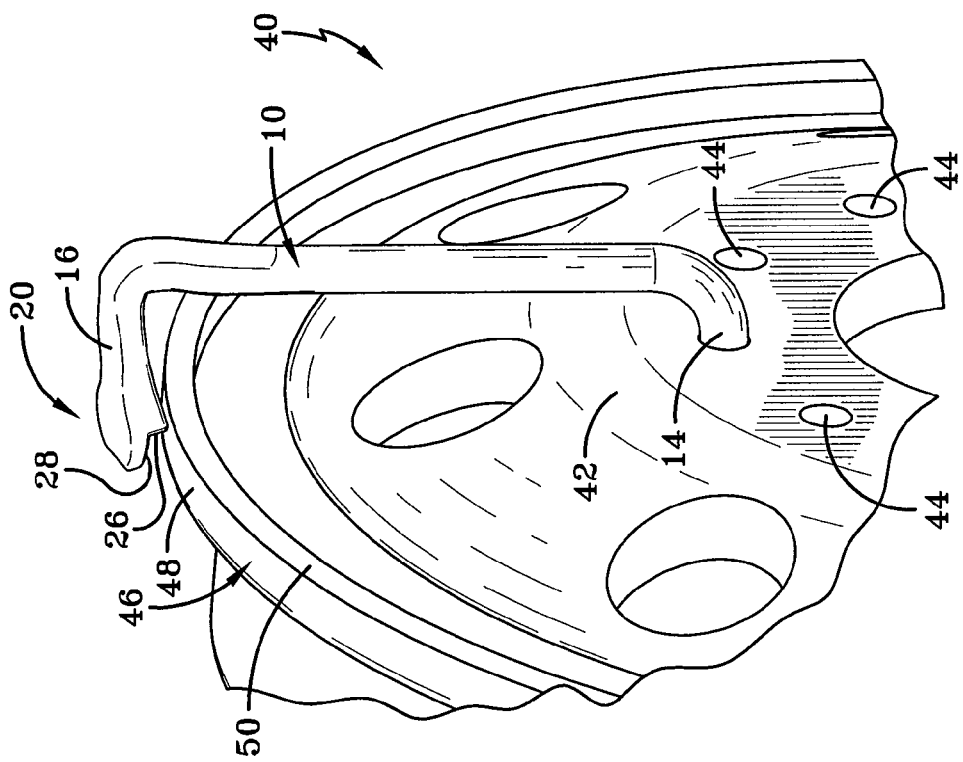
FIG. 4B is a front elevation view of the bead holder and wheel shown in FIG. 4A.

Bead holder 10 is intended to interface with a wheel, such as a 19.5-inch aluminum wheel, as follows. Turning to FIGS. 4A and 4B, a section of a wheel 40 is shown which includes a hub 42, lugholes 44, and a rim 46. Rim 46 of wheel 40 includes an outer flange 48 and a front surface 50. A wheel, such as wheel 40, is connected to an automobile's wheel assembly (not shown) by placing the lugholes over the studs protruding from the wheel assembly and fastening the wheel to the wheel assembly using fasteners, such as lug nuts. In any event, bead holder 10 is used with wheel 40 by inserting lughole end 18 of first arm 14 into any of lugholes 44, so that body portion 12 extends radially from lughole 44 in the direction of rim 46. First arm 14 is only inserted into lughole 44 to a depth where the rim end 20 remains on the hub side of rim 46. As shown in FIGS. 4A and 4B, body portion 12 and second arm 16, including rim end 20, extend radially outside rim 46 so that rim end 20 is outside of and not in contact with rim 46.

Turning to FIGS. 5A and 5B, body portion 12 and first arm 14 may then be rotated (clockwise, as shown) until second arm 16 comes into contact with rim 46. In particular, ledge 26 and face 28 of rim end 20 are designed to interface with the front surface 50 and outer flange 48 of rim 46. Specifically, the depth of first arm 14 is adjusted so that ledge 26 comes into contact with front surface 50, and bead holder 10 is rotated from the orientation shown in FIGS. 4A and 4B so that face 28 comes into contact with outer flange 48, as shown in FIGS. 5A and 5B. Once bead holder 10 is situated as shown in FIGS. 5A and 5B, bead holder 10 provides a sturdy bead holder for guiding and then holding a portion of a tire bead under the rim and preventing that portion of the bead from slipping back off the rim as the tire is mounted on the wheel. In one embodiment, the length of the first arm 14 and the second arm 16 have substantially the same length.

Bead holder 10 may be used for mounting a tire onto a wheel as follows. Initially, a user must have a wheel and a tire to install on the wheel. In some circumstances, it may be necessary to remove a damaged or otherwise unwanted tire from a wheel. This may be done using tools and methods well known in the art. Tools, such as pry bars or tools specifically designed for the purpose are commonly employed in the removal of tires from wheels. Of course, the wheel must first be removed from an automobile's wheel assembly before a tire may be removed or installed. Once the wheel is ready to have a tire installed on it, a user typically applies bead grease, or other suitable lubricant, on the rim and well side of the wheel. Bead grease temporarily reduces the friction between the tire and the wheel as the tire is stretched over the rim and installed on the wheel, encouraging an easier installation. Bead grease also contributes to establishing a proper seal between the rubber tire and the metal wheel. In any event, the wheel is then placed on the ground with the hub-side facing up. A user then positions an appropriately sized tire on the wheel so that the first tire bead, or the bead facing the ground, comes into contact with the tire rim. This first tire bead is relatively easy to stretch over the rim, and this is accomplished by placing downward pressure on the upward-facing surface of the tire. As it is known to do in the art, a user may stand or lean on the tire and the user's weight forces the first bead over the rim. Getting the second tire bead, or the bead on the hub-side of the wheel, over the rim is much more challenging.

Figure 6:
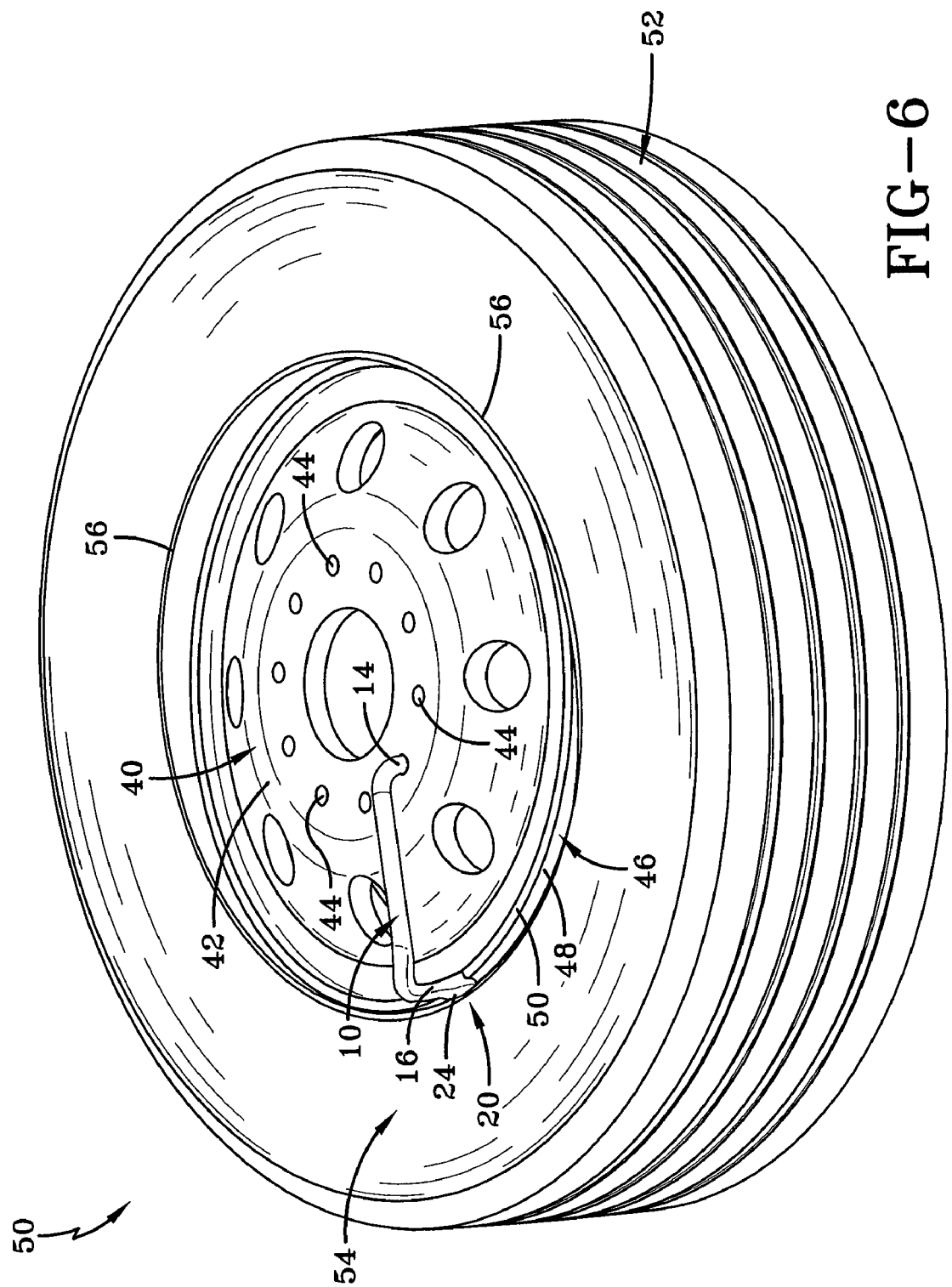
FIG. 6 shows a bead holder as used in installing a wheel on a tire.

Turning to FIG. 6, the same wheel 40 is shown, this time with a tire 50 partly installed so that the first bead has already been placed over rim 46. Tire 50 includes a tread area 52, a sidewall portion 54, and a tire bead 56. As can be seen proximate bead holder 10, a portion of bead 56 has been placed over rim 46. In any event, bead holder 10 is situated on wheel 40 as shown in FIGS. 5A and 5B. Lughole end 18 may be placed into any of lugholes 44, but preferably near the portion of bead 56 that has already been installed under rim 46. Body portion 12 and first arm 14 are then rotated (clockwise, as shown in rotating the bead holder from the position shown in FIGS. 4A and 4B to the position shown in FIGS. 5A and 5B) until second arm 16 comes into contact with rim 46. Bead holder 10 is situated so that ledge 26 comes into contact with front surface 50 and face 28 comes into contact with outer flange 48. As can be seen in FIG. 6, outer surface 24 provides a surface that prevents bead 56 from slipping back over rim 46. Beginning near bead holder 10, and moving in one direction around the wheel, a user may then begin stretching bead 56 over rim 46. Specialty tools known in the art as mount tools and having contours designed to be used with particular wheel designs may be used to stretch and pry all regions of bead 56 over rim 46. Bead holder 10 ensures that a user will not "chase" the bead around the wheel because bead holder 10 prevents bead 56 from slipping up and back over rim 46. Thus, as a user begins near bead holder 10 and works around the wheel installing the tire by stretching bead 56 over rim 46, no portion of bead 56 will be able to slip back over the rim (essentially un-installing the tire) beyond bead holder 10. The user will be successful in stretching all portions of bead 56 over rim 46, as shown in FIG. 7. The tire is thus completely installed on the wheel, and bead holder 10 may be removed from the wheel. To remove bead holder 10, the user simply rotates body portion and first arm 14 so second arm 16 is no longer in contact with rim 46. In the embodiment shown in FIG. 7, the user would rotate bead holder 10 in the counter-clockwise direction. Bead holder 10 may then be simply lifted out of lughole 44.

Bead holders prepared according to the concepts of the present invention offer several advantages over prior art forms. For one, they may be used to install tires on 19.5 inch aluminum wheels, whereas prior art bead holders cannot. Moreover, they do not include portions that resemble handles that users might attempt to use to pry a tire bead over the rim. Indeed, the fact that the first arm is placed into one of the lugholes completely prevents a user from trying to use the bead holder as a prying device.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A bead holder for preventing a bead from sliding back over the rim of a wheel when installing a tire on the wheel, the bead holder comprising:
   a body portion having a length that defines an axial plane;
   a first arm radially extending from said body portion in the axial plane;
   a second arm extending from said body portion in the same axial plane and having an inner surface and terminating at a tip;
   wherein said first arm and said second arm have substantially the same length, and
   wherein said inner surface of said second arm includes a flat face for contacting the rim of a wheel.

2. The bead holder of claim 1, further comprising a shoulder on said inner surface, wherein a ledge is defined between said shoulder and said face.

3. The bead holder of claim 1, wherein said tip has a first edge and a second edge and is rotated so that said first edge is nearer said first arm than said second edge.

4. The bead holder of claim 1, wherein said first arm extends in a generally perpendicular direction and said second arm extends at an angle that is defined between said body portion and said inner surface and is less than ninety degrees.

5. The bead holder of claim 4, wherein said second arm extends from said body portion at the angle of approximately seventy degrees.

6. A bead holder for preventing a bead from sliding over the rim of a wheel having lugholes when installing a tire on the wheel, the bead holder comprising:
   a body portion having a length that defines an axial plane;

a first arm radially extending from said body portion in the axial plane and adapted to be inserted into one of the bolt holes;

a second arm extending from said body portion in the same axial plane and having an inner surface and terminating at a tip adapted to extend beyond the rim of the wheel;

wherein said body portion is of a length suitable for positioning the first arm in one of the bolt holes and bring the second arm into contact with the rim.

7. The bead holder of claim 6, wherein said flat face is curved.

8. The bead holder of claim 6, further comprising a shoulder on said inner surface, wherein a ledge is defined between said shoulder and said face.

9. The bead holder of claim 6, wherein said tip has a first edge and a second edge and is rotated so that said first edge is nearer said first arm than said second edge.

10. A method of installing a tire having at least one tire bead onto a wheel having a rim and at least one lughole, the method comprising the steps of:

placing a portion of one of said at least one tire beads over said rim;

providing a bead holder comprising a body portion having a length that defines an axial plane; a first arm radially extending from said body portion in the axial plane; a second arm extending from said body portion in the same axial plane and having an inner surface and terminating at a tip;

placing said first portion of said bead holder into one of said at least one lugholes and positioning said second portion to be in contact with said rim between the wheel and the at least one bead;

mounting the tire bead over the rim.

11. The method of claim 10, wherein said step of placing said first portion of said bead holder into one of said at least one lugholes and positioning said second portion to be in contact with said rim between the wheel and the at least one bead comprises the steps of first situating said second portion so that said second portion extends outside said rim and then rotating said bead holder to bring said second portion into contact with said rim.

12. The method of claim 10, further comprising the step of removing said bead holder from said wheel.

13. The method of claim 12, wherein said step of removing said bead holder from said wheel comprises the step of lifting said first portion of said bead holder out of said lughole.

14. The method of claim 12, wherein said step of removing said bead holder from said wheel comprises the steps of rotating said bead holder to take said second portion out of contact with said rim and lifting said first portion of said bead holder out of said lughole.

* * * * *